Sept. 11, 1928.

L. B. WRIGHT ET AL 1,684,337

INSTRUMENT FOR SURVEYING BORE HOLES

Filed June 25, 1925      3 Sheets-Sheet 1

INVENTORS
L. B. Wright, A. B. Yates, and
A. A. Lease

BY

ATTORNEYS

Sept. 11, 1928.  
L. B. WRIGHT ET AL  
1,684,337  
INSTRUMENT FOR SURVEYING BORE HOLES  
Filed June 25, 1925  
3 Sheets-Sheet 2

Inventors  
L. B. Wright  
A. B. Yates  
A. A. Lease

By

Attorney

Sept. 11, 1928. 1,684,337
L. B. WRIGHT ET AL
INSTRUMENT FOR SURVEYING BORE HOLES
Filed June 25, 1925 3 Sheets-Sheet 3
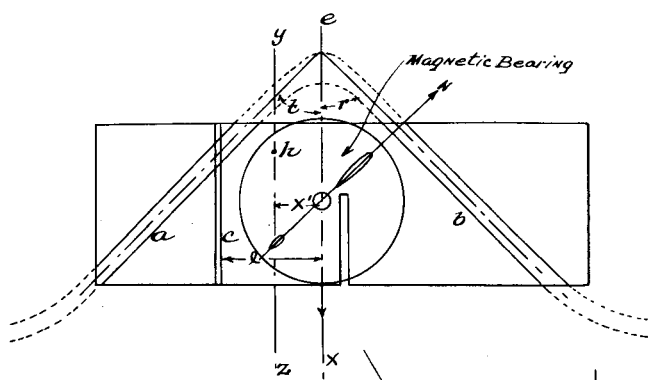
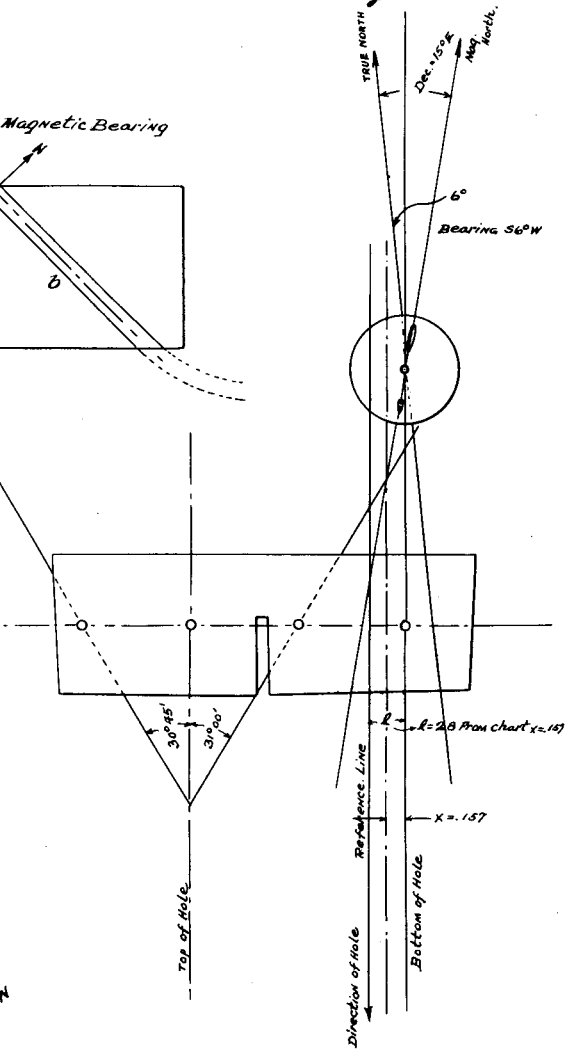
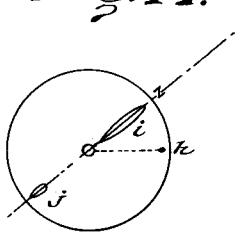
Inventors
L. B. Wright,
A. B. Yates, and
A. A. Lease.
BY
ATTORNEYS Patented Sept. 11, 1928.

1,684,337

UNITED STATES PATENT OFFICE.

LAWRENCE BOYNTON WRIGHT, ARTHUR BERKLEY YATES, AND ART AMMON LEASE, OF LEAD, SOUTH DAKOTA.

INSTRUMENT FOR SURVEYING BORE HOLES.

Application filed June 25, 1925. Serial No. 39,608.

This invention relates to an improvement in instrument for surveying bore holes, and has for its object the provision of an instrument of this character by which the direction of the hole and its inclination with respect to the horizontal may be determined and recorded with facility and accuracy and in such a manner as to enable the survey to be readily computed.

More particularly the present invention proposes the determination of the direction of the hole by photographing a representation of a magnetic compass needle on a flat film supported on a pendulously mounted body, a radioactive substance preferably being employed to effect the photographing of the needle of the compass on the film. Similarly the inclination of the hole with respect to the horizontal is determined and recorded by the photography of a line or ring on the pendulously mounted body upon a cylindrical film, impressions being made on the cylindrical film and on the flat film to enable their orientation when computing the survey.

In this way an accurate needle reading in respect of the direction of the hole is had without the use of gelatine, acids, or other liquids or fluids which are difficult to handle and which make necessary a correction for capillary attraction. Moreover, the present invention not only accurately determines the direction of the bore and its inclination from the horizontal but makes a permanent record of its determinations.

Figure 1:
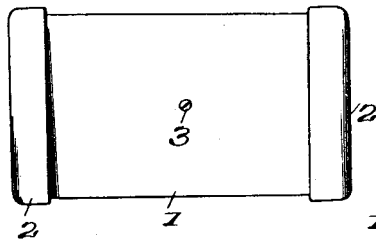
Figure 3:
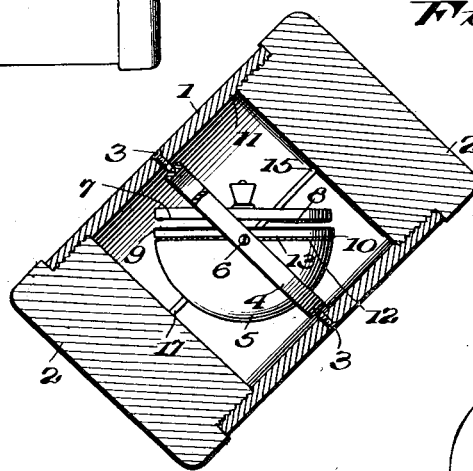
Figure 2:
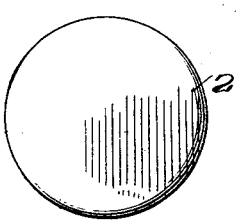
Figure 4:
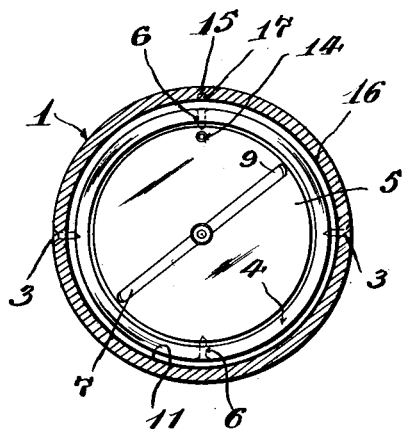
Figure 5:

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in elevation showing an instrument constructed in accordance with the present invention, Figure 2 is a view in end elevation of the instrument shown in Figure 1, Figure 3 is a view showing the casing of the instrument in section, the parts mounted in the casing being shown in elevation, Figure 4 is a view in transverse section taken just above the magnetic needle and its support with the casing in vertical position, Figure 5 is a view partly in end elevation and partly in section of the ring used in pendulously mounting the magnetic needle and flat film support.

Figure 11:
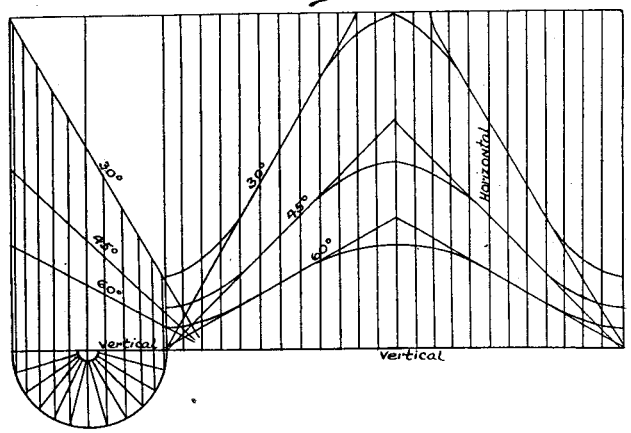
Figure 6:
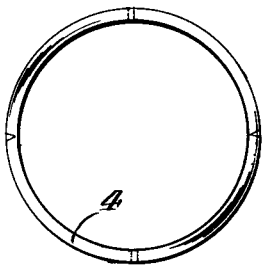
Figure 7:
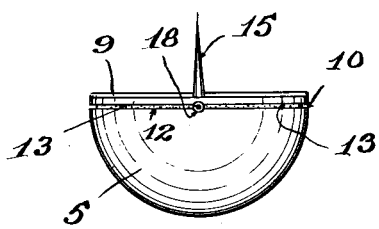
Figure 8:
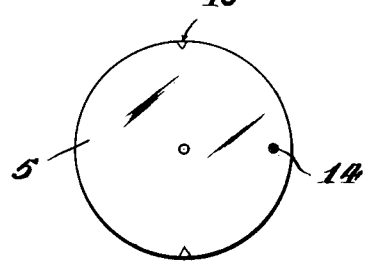
Figure 9:
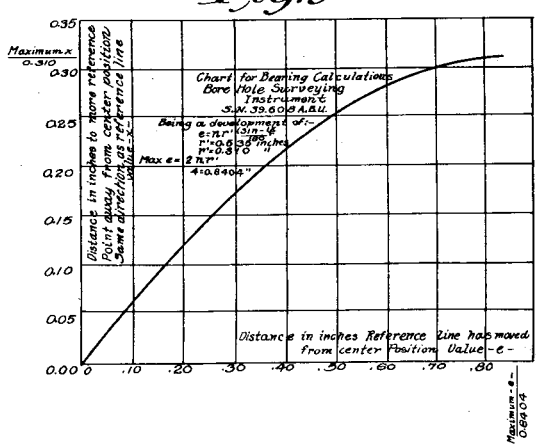
Figure 10:
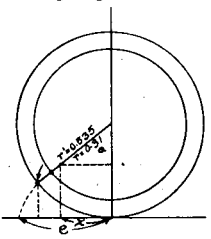

Figure 6 is a top plan view of the ring shown in Figure 5,

Figure 7 is a view in side elevation of the support for the magnetic needle and the flat film, Figure 8 is a top plan view of the element shown in Figure 7, Figure 9 is a view in elevation of a chart employed in making the survey, Figure 10 is a view illustrating one of the trigonometric calculations used in making the survey, Figure 11 is a view showing the development of a curve of which the impressions made on the cylindrical film by the radio active substance of the pendulously mounted body are portions, Figure 12 is a plan view of the developed cylindrical film having impressions thereon and laid out flat and a developed flat circular film oriented thereon, Figure 13 is a plan view showing an example taken from film actually set in an instrument and in a drill rod, and Figure 14 is a plan view showing a developed circular flat film.

Referring to the drawings the numeral 1 designates the casing of the instrument which is of cylindrical form and which has plugs 2 threaded into its ends to close the same. The plugs are removable to enable access to be had to the interior of the casing. When the plugs are in position as shown in Figure 2, a completely closed container for the receptable is provided. Of course, the casing 1 and the plugs 2 are constructed of metal or other suitable opaque material.

A needle and flat film support 5 is pendulously mounted on the casing by means of a ring 4, the ring 4 being pivotally supported on the casing by means of diametrically opposite bearing pins 3 threaded into the casing and having tapered inner ends engageable with the correspondingly formed sockets in the ring 4. In this way the ring 4 is mounted for free pivotal movement on the pins 3. The support 5 is mounted for free pivotal movement on the ring 4 about an axis at right angles to the pivotal axis constituted by the pins 3, and for this purpose pins 6 similar to the pins 3 are threaded into openings provided therefor in the ring 4 and have tapered inner ends engageable with the sockets formed in diametrically opposed portions of the support 5.

The support 5 has the shape of a hemisphere and is proportioned and balanced so that with the suspension just described its flat face will always be in the horizontal plane irrespective of how the casing my be angled.

For the purpose of determining the direction of the hole a magnetic compass needle 7 is pivotally supported on the center of the flat surface of the hemispherical body 5 and like the ordinary compass needle the needle 7 points to the magnetic north. To the underside of a portion of the needle 7 a radioactive substance 8 is applied and operates to effect upon a flat photographic film 9 an image or representation of the needle. The film 9 is applied on the flat face of the hemispherical body.

In order to determine the inclination of the hole and to make a record of this determination a cylindrical photographic film 11 is inserted in the casing between the plugs 2 and lies up against the inner wall of the casing 1. An annular groove 12 is formed in the hemispherical body 5 around the greatest circumference thereof, and in this groove 12 a radioactive substance 13 is placed and serves to effect upon the photographic film 11 a line which determines and affords a record of the inclination of the hole with respect to the horizontal.

The flat film 9 and a cylindrical film 11 bear a fixed and known relation to each other in the cylinder and in order that this relation may be preserved in computing the survey or in other words in order that the films may be oriented a small recess 14 is provided in the flat face of the hemispherical body 5 and is filled with radioactive substance which causes a dot or point to be formed on the flat film. The cylindrical casing 1 has an internal groove 15 therein which extends parallel to the longitudinal axis of the casing and which is filled with radioactive substance 17 designed to impress or effect upon the cylindrical film 11 a line which is directly opposite to or aligned with the dot or point on the flat film.

With this arrangement the films are placed in position when the apparatus is assembled in a dark room. After assembly the casing is placed in the usual fitting widely employed in making bore hole surveys and is lowered to the desired depth in the hole and left for a time sufficient to make the impressions on the films. The impression made by the radioactive substance 8 on the underside of the needle 7 records the direction of the bore determined by the magnetic needle 7. The impression made by the radioactive substance 13 in the groove 12 records the inclination of the bore relative to the horizontal since the pendulously mounted body 5 in which the groove 12 is formed shifts directly as the bore inclines from the horizontal. By using the dot made by the radioactive substance in the recess 14 and the line made by the radioactive substance in the groove 15 the films may be brought into the same relation or position which they occupy in the bore hole. The line made by the radioactive substance 17 is parallel to the direction of the hole and the angular relation between this line and the representation of the needle 7 on the film 9, corrected for magnetic declination, gives a true reading of the direction of the hole. In the same operation the angle made between a line drawn through the common tangents of the curves (the impressions made by the radioactive substance 13 on the film 11) and the impression made by the radioactive substance 17 will be the angle of inclination from the horizontal.

The cylindrical film is acted on by the radioactive substance contained in the reference line on the inner side of the tube. This line being parallel with the axis of the cylinder is also parallel with any element of the cylinder and is therefore parallel with the direction of the hole. The film is also acted on by the radioactive substance contained in the small groove around the periphery of the horizontal plate. It is obvious that the casing or tube following the inclination of the hole and the inner plate being always in a horizontal position that the impression made by the radioactive substance, on the periphery of the plate, will make an angle with the impression made by the reference line and that this angle will be equal to the angle of inclination of the hole from the horizontal which is the usual angle used to express the dip of the hole.

When the cylindrical film is taken out of the casing and rolled out flat in a horizontal plane it appears as is shown in Figure 12.

The shadow or impression $c$ is made by the reference line and the impressions $a$ and $b$ are made by the radioactive substance contained in the groove around the periphery of the horizontal plate. A line drawn through the point of the curve $e$ and parallel to the reference line would indicate the direction of the hole and would also represent the extreme low point of the hole or the bottom. This would be the center position. If it so happened that the reference line should fall exactly on the top or the bottom of the hole the impression of the reference line and the line representing the direction and bottom of the hole would coincide.

Lines drawn through the apparent centers and parallel to the impressions $a$ and $b$ should intersect at a common point on the indicated center line $e—x$ and the angles $t$ and $r$ made by these lines and the indicated center line should equal each other and will represent the angle of inclination of the hole from the horizontal.

These two impressions $a$ and $b$ are portions of a curve developed as shown in Fig. 11.

They represent the intersection of a plane with a cylinder. If an ideal case is imagined say a plane inclined to the axis of the cylinder at an angle of 30° this intersection, when the film is unrolled into a horizontal plane, would be as shown in Fig. 11. These curves are also shown for a horizontal position, a vertical position and for some other angles of inclination.

The method of developing this curve is obvious, simply divide the cylinder into elements and plot the intersections of the plane with each one of the elements on the projected plane.

The small circular film as it comes from the instrument will have three impressions as shown in Fig. 14. The small dot $h$ being the impression made by the reference point on the plate. A long narrow impression $i$ being that made by the north end of the needle and another dot $j$ being that made by the south end of the needle.

Using the two films now and referring back to Fig. 12 it is seen that the reference line has moved a certain distance away from the center line position. In other words the cylinder has so rotated that the reference line is not directly above or below the point of the curve.

The reference line on the plate moves in the same direction as the line on the inner wall of the tube. Referring to Fig. 1 let the large circle represent the cylindrical film with a radius of $r'$.

Let the small circle represent the plate and the distance from the center to the reference point be $r$. Assume that the instrument is rotated off the center position by an angle $\Theta$.

When the cylindrical film is unrolled and placed in a horizontal plane, the distance that the reference line has moved off the center position is equal to the length of arc subtended by the angle $\Theta$ or let us call it $l$. This is equal to the following formula:—

$$l = \frac{\pi r' \Theta}{180°} \quad \begin{array}{l}\Theta = \text{degrees} \\ l = \text{inches}\end{array}$$

The distance that the reference point on the plate has moved by a rotation of the same angle is equal to:

$$x = r \sin \Theta$$

so that $\Theta = \sin^{-1} \dfrac{x}{r}$ solving for $\Theta$ $\quad \Theta = \sin^{-1} \dfrac{k}{r}$ or $l = \dfrac{\pi r' \left(\sin^{-1} \dfrac{x}{r}\right)}{180}$ or $\Theta$ equals angle whose sine is $x/r$.

Knowing the dimensions of the instrument various values can be substituted in the equation from zero to the limits determined by the dimensions of the instrument. When $x$ equals $r$ then $\Theta$ equals 90° or 270°.

From the results of these the chart shown in Fig. 9 can be made and for any film the distance $-l-$ can be measured and the distance $-x-$ taken from the chart. A copy of this chart for the instrument is enclosed.

Referring again to Fig. 12 and measuring the distance $l-l$ and determining $-x-$ either from the chart or by formula, a line parallel to direction line $e-x$ can be drawn a distance $-x-$ from the line $e-x$ or $y-z$. Then by laying the circular film on the other so that the center hole in the film falls on the line $e-x$ and the small reference dot falls on the line $y-z$, the film is now oriented with respect to the direction of the hole. A line drawn through the impressions of the needle will make an angle with the direction line of the hole equal to the bearing either from the north or south. This north point, of course, will have to be corrected for magnetic declination if a true bearing is desired.

The example shown in Fig. 13 is taken from films actually set in the instrument and in a drill rod.

The rod was set at an inclination of 30° and a bearing of S 5° W.

We claim:

1. In an instrument of the character described, a casing, a body having a face, a magnetic needle pivoted on the face of the body, means for suspending the body in the casing so that the face is maintained in a horizontal position irrespective of the inclination of the casing, a film mounted on the face of the body, means for impressing on the film the representation of a needle, a film carried by the casing, and means for impressing upon the film the representation of the position of the body.

2. In an instrument of the character described, a casing, a body having a face, a magnetic needle pivoted on the face of the body, means for suspending the body in the casing so that the face is maintained in a horizontal position irrespective of the inclination of the casing, a film mounted on the face of the body, means for impressing on the film the representation of a needle and comprising a radioactive substance applied to the underside of the needle, a film arranged within the casing, said body having an angular groove, radioactive substance in the groove of the body for impressing upon the film a representation indicative of the relative position of the body to the casing, and means for orienting the films.

3. In an instrument of the character described, a casing, a body having a face, a magnetic needle pivoted on the face of the body, means for suspending the body in the casing so that the face is maintained in a horizontal position irrespective of the inclination of the casing, a film mounted on the face of the body, means for impressing on the film the representation of a needle and comprising a radioactive substance applied to the underside of the needle, a film arranged within the casing, said body having an angular groove, radioactive substance in the groove of the body for impressing upon the film a representation indicative of the relative position of the body to the casing, means for orienting the film and including a longitudinal groove in the casing containing radioactive substance for impressing a line upon the film of the casing parallel to the longitudinal axis of the casing, and a recess in the body containing a radioactive substance for impressing a point upon the film of the body.

4. In an instrument of the character described, a cylindrical casing, a hemispherical body within the casing, means for pendulously mounting the hemispherical body including a ring, means for pivoting the ring to the casing, and means for pivoting the body to the ring, the body moving about an axis at right angles to the axis of movement of the ring, a magnetic needle pivotally mounted on the flat face of the body, a flat film mounted on the flat face of the body between the magnetic needle and the body, radioactive substance applied to the underside of the needle so as to overlie the flat film, a cylindrical film mounted on the inner peripheral wall of the casing, an annular groove extending around the greatest circumference of the hemispherical body and containing a radioactive substance, the cylindrical film being exposed to the action of the radio active substance of the annular groove said casing having an internal longitudinal groove containing radioactive substance to which the cylindrical film is also exposed, said body having a recess in its flat face containing radio active substance to which the flat film is exposed.

LAWRENCE BOYNTON WRIGHT.
ARTHUR BERKLEY YATES.
ART AMMON LEASE.